Patented Feb. 3, 1931

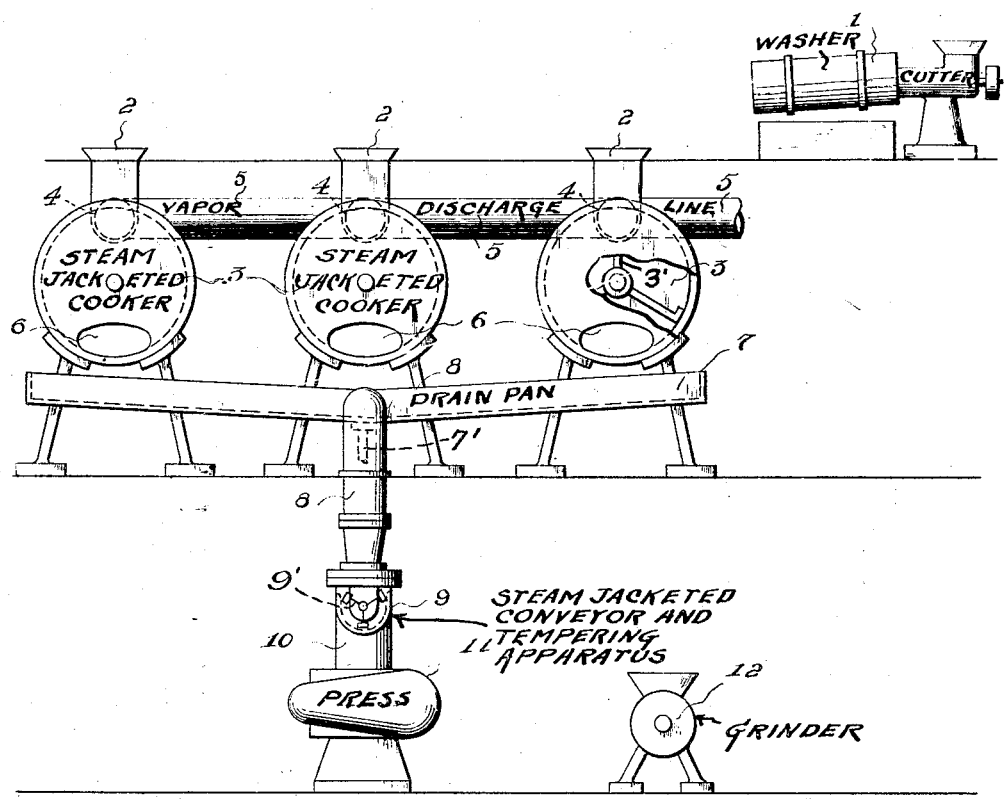

1,791,439

UNITED STATES PATENT OFFICE

WILLIAM B. ALLBRIGHT, OF CHICAGO, ILLINOIS

SEMICONTINUOUS DRY-RENDERING AND MEAL-MANUFACTURING PROCESS

Application filed March 30, 1925. Serial No. 19,378.

The present invention relates to semi-continuous processes of dry rendering, and manufacturing meal.

More particularly the invention relates to semi-continuous processes for dry rendering fat and oil containing solids, such as animal parts, packing house offal and the like by utilizing batch cookers or driers, expressing the heated solids in hydraulic curb or continuous high pressure presses, and reducing the solids from the press to a meal.

In the production of kettle rendered lard it has for many years been the practice to hash or cut the fat containing materials into relatively small particles. The cut material is then heated to melt the fats and to remove or expel the moisture by the application of indirect heat, usually in steam jacketed cookers or kettles, while the evolved gases and vapors are permitted to escape, and the material is agitated by rotating stirrers. The heating and stirring is carried on until the cracklings are browned or slightly crisped, and the material is then discharged into a percolator or strainer where the free hot fats and oils are drained off. The cracklings are then pressed in suitable hydraulic or high pressure screw presses to remove the remaining fats. Lards and fats produced in this well known manner are usually not white in color.

In my United States patent numbered 1,317,675, issued October 7, 1919, I have disclosed an improved semi-continuous process for making high grade edible fats of pure white color without the use of bleaching agents. In handling fats, when the materials are heated materially above 220 to 240 degrees Fahrenheit after the moisture content of the cracklings is reduced below the range of 15 to 20 percent, the rendered products are discolored and injured in quality by absorption of glues. The moisture content in the solids also bears a close relation to the quantity of fats which may be expressed from the cracklings. If the moisture content is too high, when the materials are expressed in continuous high pressure screw presses, mucilaginous and glue-like substances are expressed with the fats, and a poorly pressed residue containing too much fat is obtained. If on the other hand, the cooking or drying is continued in the usual melter or dryer until the clear fats without glues may be expressed satisfactorily in a continuous screw press or hydraulic press, the temperatures rise as the moisture content of the material is reduced to the proper stage for expressing, and discoloration of the fats or lard occurs.

When handling a mixture of materials which should produce high grade fats, such as tongue trimmings, fat from middle beef guts, beef cooler trimmings, lungs, rennets, round and middle guts, bung guts, and dirty oleo fats, at temperatures of 260 degrees Fahrenheit with a relatively low moisture content, a distinct discoloration occurs. Accordingly, in the improved process set forth in my patent, the cracklings are discharged from the cooker or heating unit while the moisture content is still too high for satisfactory expressing in a high pressure screw press, and before seriously discoloring temperatures are acquired. The free hot fats are then drained from the cracklings in a percolator, and the cracklings are dried and toughened to the proper point by spreading them out in contact with the air. As soon as the cracklings are properly dried and toughened, they are passed continuously through a heating unit into any well known high pressure screw press commonly used for this purpose. A very satisfactory pressed crackling and a high grade of edible fat is produced in this manner.

It has long been well known that fresh animal parts of all kinds, when dry rendered, give off vapors which are not offensive. In many slaughtering houses these vapors are permitted to escape directly to the air, and the rendering of fresh parts may even be carried out in open kettles without generation of obnoxious odors. In the production of lower grade tallow, however, especially in smaller establishments, the materials to be rendered are frequently in more or less decomposed state when put into the dry rendering cookers or melters. For this reason it has been long the practice to use enclosed steam jacketed melters in which the gases have been withdrawn as evolved and condensed or otherwise treated to effect deodorization. It is also the practice to confine vapors in closed cookers in large slaughtering houses so that the steam and generated vapors may be conducted out of the buildings.

The solid residue from the prior dry rendering processes is of much higher grade than the residue from the well known wet rendering processes. When suitable materials are rendered as set forth in my above mentioned patent, the cracklings may be made into food fit for human beings. For lower grade products, the residue is made into stock food, and fertilizers, and it has been for many years well known that the meals produced in the dry rendering processes are superior in quality to the meals from the tankage of wet rendered products. This is due to the fact that the addition of water in digesting in the well known wet rendering methods causes decomposition of the material, dissolves the water soluble contents, and leaves a more or less decomposed residue for the manufacture of meal which is of low grade.

To utilize these well known advantages of dry rendering, in the production of higher grade meals than are obtainable by wet rendering methods, and where the quality of fats may be sacrificed, particularly in the handling of inedible animal parts, such as the entrails, lungs, livers, offal, shop scraps, condemned carcasses, condemned viscera, tripe and guts hashed, rennets, bruised fat, stomachs, bladders, slunks, tripe trimmings, pigs feet, pecks hashed and washed, gullets, bung guts, cutting scrap tallow, and the like, I modify the process set forth in my patent by eliminating the refinements therein practiced to avoid the discoloration of the fats. This is effected by heating the materials while confined in dryers or melters until the moisture content has been lowered to the point where the fats may be effectively expressed from the solid residue in a continuous high pressure press. After being discharged from the dryer or melter the free fats are drained away in a steam jacketed drying pan or percolator, and the solid residue is then continuously passed to a high pressure screw press or any other suitable type of press without the delay to effect further low temperature drying, set forth in my patent by spreading the cracklings. The fats produced in this way are discolored and of low grade.

In endeavoring to avoid the discoloration produced in the fats, I have discovered that this may be effected by a variation of my process for handling inedible or low grade products, which comprises separating the free hot fats from the melter or dryer before the moisture content of the cracklings or solids is lowered to the point where serious discoloration of fats will occur, and then continuing the heating of the residue until the moisture content is reduced to the required point for satisfactory expressing. The residue is then dropped into a draining pan and passed to a continuous press, as above set forth. The fats obtained in the latter stage of the process will be discolored, while the fats drained off in the first stage will be high grade. The major portion of the fats will be obtained in the first stage, and in practice the smaller portion of the fats which will be discolored may then be mixed with the high grade fats without serious injury to the grade of the mixed product. In this way, the quality of the fats is raised materially. In establishments where large volumes of fats are handled the discolored fats may be retained separate from the higher grades and sold as a lower grade product.

Referring to the drawings, the figure indicates in diagram a preferred embodiment of arrangement of apparatus to carry out my invention.

The material to be rendered, such as entrails, lungs, condemned animal parts, offal, and the like, may be cut and washed thoroughly in a cutter and washer indicated at 1 which may be of any well known type. The cutter and washer is not essential and may be eliminated especially when treating scraps or like material containing bone. The materials are then passed into hoppers 2 and fed into the steam jacketed melters or dryers 3 containing agitators 3' driven in any suitable manner to continuously agitate the material. These driers or melters may be of the type disclosed in British Patents 8397 of 1912 and 3663 of 1914, or of any other well known steam jacketed type. A jacket pressure of 40 pounds per square inch gives excellent results although this pressure may vary widely in practice. The material is heated and agitated in the melters in well known manner and the evolved vapors, gases and steam are withdrawn through openings 4 and led by pipe 5 to the open air or a suitable condenser, treated to destroy any obnoxious odors, or treated in any other suitable manner.

The heating and agitation is continued until the moisture content is reduced to the point where the fats may be immediately and effectively expressed from the solid residue in a continuous high pressure press, when the quality of fats is to be disregarded. For proper expressing in high pressure rotary screw presses developing from several hundred to many thousand pounds per square inch, the most satisfactory moisture content is approximately from three to eight per cent, although this may vary widely with different types of presses.

When the proper degree of dehydration or drying has been reached, the hot dehydrated material is discharged through discharge openings 6 to a steam jacketed percolator or a draining and drying table or tank where the free hot fats are drained from the solid residue. A steam jacketed draining table 7 is shown in the illustrative embodiment of the invention. The fats may be drained from the table as in my prior patent above referred to, or in any other suitable way. For example the fats may be drained into suitable storage vats through the drain pipe 7'. As soon as the free hot fats and oils are drained off, the solid residue or cracklings are pushed into passage 8, and pass downward to a steam jacketed conveyor or tempering apparatus 9 such as shown in Patents #1,132,421 and #1,132,422, for example, in which they are further heated, agitated and fed through the conveyor by means of agitating and feeding arms 9'. From conveyor 9 the hot material passes downward through 10 into a continuous high pressure screw press 11 of any well known type in which the fats are expressed from the solids at pressures ranging up to several thousand pounds per square inch or more, leaving a press cake containing as low as five or six percent fat.

In operation the melters and dehydrators are filled successively and will accordingly be ready for discharging the material and recharging at different times. As soon as the first charge is deposited on the draining and drying table, the press may be started and continuous operation thereof may be maintained until the last charge is expressed.

When treating materials which contain relatively large pieces of bone, either before cooking or after draining and before pressing, it is necessary to grind the material in order to reduce the bone to a size which may be handled by the press. The bone particles, treated in this manner, tend to become hard or flint-like in character and tend to rapidly wear the press. They also are more or less indigestible and insoluble and are unsatisfactory for this reason in both food and fertilizer meals. Before they can be absorbed by the soil they must lie a sufficient time to decompose. Materials without the bone content, however, reduce to high grade foods and fertilizers in which all the water soluble solids ordinarily lost in wet rendering are retained.

The press cake may be ground into meal in a grinder 12 to be used as stock food or fertilizer, or it may be lixiviated and treated to extract the glues.

It will be seen that a semi-continuous rendering process is provided which differs from the process set forth in my above mentioned patent in that the quality of fats is sacrificed in the present case by drying the materials in the melter to a point where they may be pressed from the hot solids in a screw press or hydraulic press, immediately after the free hot fats are drained away.

To raise the quality of the grease and fats obtained the operation above set forth is varied by stopping the agitation and withdrawing the free fats from the melter by opening a suitably arranged drain cock in well known manner when a substantial portion of the fat is released, and the moisture content of the residue or cracklings is still above the point where discoloration of the fats occur. Discoloration and injury to quality occurs at the temperatures employed when the moisture percentage goes below the range of 15 to 20 percent in the cracklings, the critical value being apparently about 16 per cent, while the fat temperatures exceed 220 to 240 degrees Fahrenheit. So long as the moisture content is above about 15 to 20 degrees F. no harm is done by heating the fats above 220 to 240 degrees Fahrenheit.

After the free fats are drained off, agitation and heating of the residue in the cooker, is continued as above set forth until the cracklings are reduced to the proper moisture content for pressing, preferably in a continuous screw press. By way of a practical example of carrying out my process to procure the higher grade fats the following illustration is given.

A standard dry cooker or melter, charged with 4200# of material including 400# tongue trimmings, 500# chip fat from middle and round beef guts, 500# beef cooler trimmings, 400# lungs, 400# rennets, 500# round and middle guts ends, and 250# bung gut ends, and 1250# dirty oleo fat. The charge was then heated and agitated with a jacket steam pressure of 40# per square inch for a period of two hours, at the end of which time agitation was stopped, and the free fats were drained out of the melter. The fats discharged at a temperature of 220 degrees Fahrenheit and were high in quality. The residue or cracklings at this state were in a wet slimy condition showing upon analysis about 40 percent of moisture. The cooker or melter was then closed up and the residue heated and agitated for another two hour period at the end of which time the agitation was again stopped, and the remaining free fats were drained off. These fats discharged at a temperature of 260 degrees Fahrenheit and were of lower grade showing a distinct discoloration. The cracklings at this stage upon analysis showed a moisture content of 5 percent, and were in a condition to be pressed in a screw press.

Further tests have shown that for inedible tallows, as the moisture content of cracklings approaches 16 percent, the temperature of the fats may range as high as 240 degrees Fahrenheit without serious injury to the market value of the tallow, while edible products should not go over 220 degrees Fahrenheit as this value of moisture is approached. In practice as the residual moisture percentage of a batch of usual run of inedible products, approaches sixteen percent, such for example as a charge of 4200# of materials including 500# packs, 100# belts, rennets 350#, 300# dirty oleo fats, 600# tongue trimmings, 200# lungs, 300# round and middle gut ends, 400# bung gut ends, 150# cooler beef trimmings and 500# crisp fat from round and middle guts, about 80 percent of the tallows may be drawn off as a relatively high grade product. This condition is approached in the usual large size fat melter of 4200 to 4500 pounds capacity after about three and one-half hours of agitation and heating of the usual charge to a temperature corresponding to approximately 40 pounds pressure in the steam jacket.

As this condition is approached the fats will reach about 240 degrees Fahrenheit in temperature, and when this temperature of fats is reached it may be taken as a practical indication that agitation should be stopped and the high grade inedible tallows withdrawn. After the free fats are withdrawn, agitation and heating should be resumed until the moisture content of the cracklings is reduced to the range for proper pressing. This finishing stage will require from 1 to 1½ hours. It will be obvious that the draining of fats may be effected at a plurality of intervals as the critical discoloring moisture and temperature relation is approached. For practical operation, the best results are obtained when the high grade fats are withdrawn from the melter with the moisture content of the cracklings ranging between 20 and 40 percent, so that relatively unskilled labor may be utilized to carry out the operation without endangering the quality of fats in different batches by passing the critical temperature moisture relationship range.

Having described preferred embodiments of my invention what is desired to be secured by Letters Patent and claimed as new is:

1. The process of dry rendering fat-containing solids of animal origin which comprises subjecting the materials to heat and agitation while withdrawing the vapors evolved during the heating and agitation, continuing the application of heat and the withdrawal of vapors until the residue reaches a temperature approximating but less than the temperature at which the glues and mucilaginous substances are separated from the solid residue and until the moisture content is reduced to from twenty to forty percent; draining the free hot fats and oils from said residue, and then again continuing the application of indirect heat and the withdrawal of vapors until the moisture content of the solid residue is reduced to from three to eight percent, and then subjecting the residue to progressively increasing pressure to complete the separation of the fats therefrom.

2. The process of dry rendering fat-containing solids of animal origin, which consists in subjecting the solids to indirect heat and continuous agitation while simultaneously withdrawing evolved vapors until the moisture content of the solid residue is reduced to from twenty to forty percent, then draining the free fats from the solid residue, then continuing the application of indirect heat and continuous agitation accompanied by the simultaneous further withdrawing of evolved vapors until the moisture content of the solid residue is further reduced to from three to eight percent and then finally separating the remaining fats from the residue by straining and by subjecting said residue to progressively increasing pressure.

3. A semi-continuous process of dry rendering fats containing solids of animal origin, which consists in subjecting the solids to indirect heat and continuous agitation while simultaneously withdrawing vapor until the moisture content of the solids contained in the material is reduced to from approximately 16 to 40 percent, then draining the free fat from the solid residue, then continuing the application of indirect heat and continuous agitation accompanied by the simultaneous further withdrawing of evolved vapors until the moisture content of the solid residue is further reduced to from approximately three to fifteen percent, and then substantially immediately separating the remaining fats from the residue by straining and by subjecting said residue to progressively increasing pressure.

In testimony whereof, I affix my signature.

WILLIAM B. ALLBRIGHT.